US009282064B2

(12) United States Patent
Klotsche et al.

(10) Patent No.: US 9,282,064 B2
(45) Date of Patent: Mar. 8, 2016

(54) METHOD FOR PROCESSING A PLURALITY OF DATA AND SWITCHING DEVICE FOR SWITCHING COMMUNICATION PACKETS

(75) Inventors: Ralf Klotsche, Neuenbürg (DE); Michael Tangemann, Leonberg (DE)

(73) Assignee: Alcatel Lucent, Boulogne-Billancourt (FR)

( * ) Notice: Subject to any disclaimer, the term of this patent is extended or adjusted under 35 U.S.C. 154(b) by 112 days.

(21) Appl. No.: 13/511,823

(22) PCT Filed: Nov. 18, 2010

(86) PCT No.: PCT/EP2010/067753
§ 371 (c)(1),
(2), (4) Date: May 24, 2012

(87) PCT Pub. No.: WO2011/072978
PCT Pub. Date: Jun. 23, 2011

(65) Prior Publication Data
US 2012/0275460 A1    Nov. 1, 2012

(30) Foreign Application Priority Data
Dec. 17, 2009   (EP) .................................... 09290960

(51) Int. Cl.
*H04L 12/56* (2006.01)
*H04L 12/939* (2013.01)
(Continued)

(52) U.S. Cl.
CPC ............ *H04L 49/552* (2013.01); *H04L 49/309* (2013.01); *G06F 9/45533* (2013.01); *G06F 9/45558* (2013.01); *G06F 2009/4557* (2013.01)

(58) Field of Classification Search
USPC .......................................... 370/392; 700/2–4
See application file for complete search history.

(56) References Cited

U.S. PATENT DOCUMENTS 5,473,607 A * 12/1995 Hausman et al. ............. 370/392
5,708,659 A * 1/1998 Rostoker et al. ............. 370/392
(Continued)

FOREIGN PATENT DOCUMENTS

| CN | 1497911 A | 5/2004 |
| CN | 1533102 A | 9/2004 |

OTHER PUBLICATIONS

RFC 2105, "Cisco Systems' Tag Switching Architecture Overview", Feb. 1997m Network Working Group, 13 pages.*
(Continued)

*Primary Examiner* — Brian J Gillis
*Assistant Examiner* — Amy Ling
(74) *Attorney, Agent, or Firm* — Harness, Dickey & Pierce, P.L.C.

(57) ABSTRACT

The invention concerns a method of processing a plurality of data packets in a packet switched communication network comprising at least one switching device (1) as well as a corresponding switching device. The switching device (1) comprises two or more sub-engines (21, . . . , 29). A control unit (7) of the at least one switching device (1) receives a data packet comprising a header (10) of a communication packet exchanged via the communication network. The control unit (7) applies at least one filter operation (50) to the header (10) and generating thereby filtered information (100). The control unit (7) maps the filtered information (100) on a hash-tag (30) according to a hash-function (300). The control unit (7) provides a tagged-header (11) by means of inserting the hash-tag (30) in the header (10) of the data packet. The control unit (7) sends the data packet to a sub-engine (24) of the two or more sub-engines (21, . . . , 29) according to the tagged-header (11) for further processing of the data packet.

15 Claims, 2 Drawing Sheets

(51) Int. Cl.
*H04L 12/935* (2013.01)
*G06F 9/455* (2006.01)

(56) References Cited

U.S. PATENT DOCUMENTS

| | | | | |
|---|---|---|---|---|
| 6,567,377 | B1* | 5/2003 | Vepa et al. | 370/230 |
| 7,463,648 | B1* | 12/2008 | Eppstein et al. | 370/468 |
| 2003/0081600 | A1* | 5/2003 | Blaker et al. | 370/389 |
| 2004/0071142 | A1* | 4/2004 | Moriwaki et al. | 370/392 |
| 2004/0184453 | A1 | 9/2004 | Moriwaki | |
| 2005/0078601 | A1 | 4/2005 | Moll et al. | |
| 2006/0056406 | A1* | 3/2006 | Bouchard et al. | 370/389 |
| 2007/0195773 | A1* | 8/2007 | Tatar et al. | 370/392 |
| 2007/0239891 | A1* | 10/2007 | Wainner et al. | 709/238 |
| 2007/0261110 | A1* | 11/2007 | Oz et al. | 726/11 |
| 2009/0213868 | A1 | 8/2009 | Budhia et al. | |
| 2010/0115174 | A1* | 5/2010 | Akyol et al. | 710/316 |
| 2010/0150158 | A1* | 6/2010 | Cathey et al. | 370/392 |
| 2011/0107007 | A1* | 5/2011 | van Riel et al. | 711/6 |

OTHER PUBLICATIONS

Deering et al., RFC 2460—Internet Protocol, Version 6 (IPv6_Specification, Dec. 1998, Standards Track.*
Intel Ethernet controllers, "White Paper—Improving Network Performance in Multi-Core Systems", Intel Corporation, 2007, 4 pages.*
Cisco, "DiffServ—The Scalable End-to-End QoS Model", Aug. 2005, p. 2-3, 17 pages.*
International Search Report PCT/ISA/210.
Written Opinion PCT/ISA/237.
E. Rosen et al., "Multiprotocol Label Switching Architecture", Network Working Group, Jan. 2001, 1-61, rfc3031-MPLS.
H. Schulzrinna et al., "A Transport Protocol for Real-Time Applications", Netowrk Working Group, Jul. 2003, 1-104, rfc3550-RTP.
J. Rosenberg et al., "Session Initiation Protocol", 'Network Working Group, Jun. 2002, 1-18, rfc3261-STP.
J. Postel et al., "File Transfer Protocol", Network Working Group, Oct. 1985, 1-69, rfc959-FTP.
T. Ylonen et al., "The Secure Shell (SSH) Transport Layer Protocol", Network Working Group, Jan. 2006, 1-31, rfc423-SSH.
R. Fielding et al., "Hypertext Transfer Protocol", Network Working Group, Jun. 1999, 1-12, rfc2616-HTP.
R. Khare et al., "Upgrading to TLS Within HTTP/1.1", Network Working Group, May 2000, 1-13, rfc2817-HTTPS.
Jonathan B. Postel, "Simple Mail Transfer Protocol", Internet Standard, Aug. 1982, 1-67, rfc821-SMTP.
J. Klensin, "Simple Mail Transfer Protocol", Network Working Group, Oct. 2008, 1-94, rfc5321-SMTP.
IEEE Standards Association, "Local and Metropolitan Area Network Standards", LAN/MAN Standards Committee, May 2006, 1-18, IEEE Std802.1Q-2005.

* cited by examiner

METHOD FOR PROCESSING A PLURALITY OF DATA AND SWITCHING DEVICE FOR SWITCHING COMMUNICATION PACKETS

The present invention relates to method for processing a plurality of data packets in a packet switched communication network as well as a corresponding switching device.

Nowadays, the data packets and/or communication packets associated with packet switched communication services are rapidly increasing in number. Consequently, the load on packet switched communication networks is increasing in a similar manner. Furthermore, the fraction of the data packets associated with real time services supported by the packet switched communication network is also increasing. The real-time service, like Voice over IP service, Video Conferencing services, Multi-user online gaming services, etc., are time critical services which require an ordered and a rapid transmission and arrival of the data packets associated with the real time service (IP=Internet Protocol). However, switching devices like switches, bridges, routers, gateways, etc., support the packet switched communication network in routing data packets which belong together from a source node to a destination node. The source and destination node belong to the packet switched communication network. Thereby, the load of the switching devices may increase overproportional. As a further problem, the QoS of packet based real-time services may decrease (QoS=Quality of Service).

Thus, an object of the present invention is to provide an improved method for processing a plurality of data packets in a packet switched communication network. It is further an object of the present invention to provide an improved switching device for switching communication packets in a packet switched communication network.

The object of the present invention is achieved by a method for processing a plurality of data packets in a packet switched communication network comprising at least one switching device, wherein a control unit of the at least one switching device receives a data packet comprising a header of a communication packet exchanged via the communication network, the control unit applies at least one filter operation to the header and generates thereby filtered information, the control unit maps the filtered information on a hash-tag according to a hash-function, the control unit provides a tagged-header by means of inserting the hash-tag in the header of the data packet, and the control unit sends the data packet to a sub-engine of two or more sub-engines of the switching device according to the tagged-header for further processing of the data packet. The object of the present invention is also achieved by a switching device for switching communication packets in a packet switched communication network, wherein the switching device comprises two or more sub-engines and a control unit, wherein the control unit is adapted to receive a data packet comprising a header of one of the communication packets exchanged via the communication network, apply at least one filter operation to the header and generate thereby filtered information, map the filtered information on a hash-tag according to a hash-function, provide a tagged-header by means of inserting the hash-tag in the header of the data packet, and send the data packet to a sub-engine of the two or more sub-engines according to the tagged-header for further processing of the data packet.

The wording communication packet may be used synonymously instead of the wording data packet. However, in general, a communication packet may be a data packet of a communication service associated with the data packet.

By means of the present invention it is possible to send data packets to a sub-engine for further processing without explicit or without complete knowledge, i.e. with incomplete knowledge, of the content of the data packet and/or a data traffic flows associated with the data packet. The data traffic flow associated with the data packet can be specified by a five-tuple comprising ordered elements, wherein the elements are an IP source address, an IP destination address, an IP source port, an IP destination port, and a type of transport protocol in serial arrangement. In particular, it is possible that this incomplete knowledge of the content of the data packet and/or a data traffic flows associated with the data packet does not comprise any address information, e.g. IP source address or IP destination address, protocol identifiers, or other IP address related information, like source or destination ports. The hash-tag, i.e. the hash-value, corresponding to the filtered information mapped by hash-function can be or is similar to a pseudo random number which is used as an identifier or label indicating the sub-engine for the further processing. Data packets associated with the same hash-tag can be sent to the same sub-engine for the further processing. Thereby, embodiments of the present invention provide a simple routing of data packets to a sub-engine for the further processing of the data packet, e.g. switching and/or routing the data packet according to its header and/or its content. Consequently, embodiments of the present invention provide the switching of the plurality of data packets separated in basically two steps: In a first step and in a simple manner, i.e. in a numerically and computationally fast manner, possibly without any evaluation involved, a hash-tag is provided which indicates which sub-engine performs the switching of the data packet in the second step. In particular, embodiments of the present invention can be unaware of a state of the data packet, a signaling and/or a protocol associated with the data packet, an addressing associated with the data packet and/or a data traffic flow associated with the data packet during said first step.

Typically, the two or more sub-engines can be a central processing unit with one or more processing cores, like a rack-mounted processing node, of a parallel processing computer and/or of network computing cluster. It is also possible the sub-engine is a processing unit of a massive parallel processing architecture. For instance, a massive parallel processing architecture is a massive parallel processor, a massive parallel computer and/or a parallel computing cluster with at least 100 processing cores and/or processing nodes, preferably 128 to 1048576 processing cores and/or processing nodes, respectively. It is possible to address up to 1048576 processing cores and/or processing nodes by means of the 20 bits of an MPLS tag (MLPS=Multiprotocol Label Switching), wherein in such a case the 20 bits correspond to $2^{20}=1048576$ different addresses. Sub-engines can be connected to a data base comprising data associated with the hash-tag and/or the data packet for the further processing of the data packets. Since embodiments according to the present invention may sent data packets associated and/or labeled with the same hash-tag to the same sub-engine, the sub-engine rarely updates the data associated with the hash-tag and/or the data packet or data packets processed. Thereby, the data base is rarely accessed, preferably only one time accessed, to update, preferably provide, the data associated with the hash-tag and/or the data packet or data packets processed. Consequently, embodiments of the present invention provide an enhanced scalability concerning the number of the two or more sub-engines.

Thereby, embodiments of the present invention can provide an improved scalability where high volume traffic, i.e. data traffic flow, has to be handled and scalability concerns hinder the growth of the system or the introduction of new features, like data traffic flow awareness.

Embodiments of the present invention can provide that the complexity and the load on an individual processing core, e.g. in a massive parallel processing architecture, is limited to the fraction given by the total number of processing cores available after hashing and/or switching. In particular, embodiments of the present invention can be used for a pure load distribution, for a protocol agnostic distribution of load and complexity, allowing stateful behavior of individual data traffic flows, and/or for a load, complexity and reduction of functional range of a sub-engine.

In case, that an embodiment of the present invention is used for a load, complexity and reduction of functional range of a sub-engine, such a usage can be achieved by cascading the embodiment in two or more steps: The first step generates a hash-distribution, using information elements of packet headers relevant to derive the various functions. A hash-function may be a distribution generated by a hash-function or may be a special hash-function. A subsequent step maintains scalability by distributing the flows belonging to a group of functions to various sub-engines. Such a usage is important for application enablement to provide network gears with a future safe architecture, because of the special treatment of data traffic flows which can be dispatched to dedicated sub-engines only by knowing "where"—in the header structures—the key information is, before the "what" is defined and/or determined.

It may be understood that the wording hash-function in connection with the present invention can be used as a function in a generalized meaning.

Preferably, the hash-function maps subjectively one or more one-dimensional or multi-dimensional values to or onto, respectively a set of hash-values. The one or more one-dimensional or multi-dimensional values may also be called input values of the hash-function. The hash-function maps a given input value to an output value which is a hash-value being an element of the set of hash-values. The wording hash-tag may be used for the output value of the hash-function. Furthermore, the cardinality of the set of input values is at least as great as the cardinality of the set hash-values or the set of output values.

It is possible that the control unit is a sub-engine of the two or more sub-engines.

Embodiments of the switching device according to the present invention comprise preferably switches, bridges, routers, gateways, core and/or edge devices, etc.

Further advantages are achieved by embodiments of the present invention indicated by dependent claims.

According to a preferred embodiment of the invention at least one filter operation for filtering information from the header can be provided. Preferably, the control unit provides the at least one filter operation for filtering information from the header. The at least one filter operation filters-out an identifier. The identifier indicates an association of the data packet to a data traffic flow of one or more data traffic flows associated with the plurality of data packets. The hash-function maps the filtered information comprising said identifier to a, preferably natural, number k. It is possible that the control unit provides and/or performs the hash-function for mapping the filtered information. The number k is an element of the interval $[m, \ldots, M]$ of natural numbers. The natural number m is a minimum value. Preferably, the minimum value m=1. M is a maximum value with M<N or M=N. N is the number of the two or more sub-engines. In particular, it is possible that the minimum number m and the maximum number M are the minimum number and the maximum of the numbers in the interval $[m, \ldots, M]$. Preferably, the cardinality of the interval $[m, \ldots, M]$ is larger than or equal to the number of one or more data traffic flows in order to send data packets associated with a different data traffic flows of the plurality of data packets to different sub-engines of the two or more sub-engines in accordance with the tagged-header.

In particular, it is possible that the two or more sub-engines are numbered, indexed and/or labeled, preferably starting form the number 1 and ending with the number N which is the number of the two or more sub-engines. Thereby, the hash-tag comprising the number k can be used as information to which sub-engine the data packet has to be sent for the further processing. The number k is generated by the hash-function for mapping the filtered information. It is possible that the number, index and/or label, respectively corresponds to an address which is a MPLS tag or a VLAN tag (VLAN=Virtual Local Area Network). The hash-tag can be used as MPLS tag or VLAN tag.

Preferably, data packets of the plurality of data packets are assigned to one or more data traffic flows. The control unit can send data packets associated with the same data traffic flow of the one or more data traffic flows to the same sub-engine of the two or more sub-engines in accordance with the tagged-header for the further processing of the data packet associated with the same data traffic flow. The at least one filter operation is generated, preferably by the control unit, for filtering information from the header. The at least one filter operation may be adapted to filter an identifier indicating an association of the data packet to data traffic flow of the one or more data traffic flows.

According to a preferred embodiment of the invention the sub-engine receives the data packet from the control unit for the further processing of the received data packet. The sub-engine accesses a data base holding data associated with the received data packet and/or the hash-tag for the further processing of the received data packet in case a memory of the sub-engine is not holding the data associated with the received data packet and/or the hash-tag. The sub-engine processes the received data packet by using the header, the data associated with the received data packet and/or the hash-tag, and/or a payload of the received data packet.

It is possible that the sub-engine accesses the data base holding the data associated with the received data packet and/or the hash-tag for acquiring data necessary for the processing the received data packet. Preferably, the sub-engine accesses the data base only the first time or each time when the sub-engine processes or further processes the received data packet associated with the hash-tag. In case, that the data base is accessed only the first time a network load and/or a load on the data base can be reduced while at the same time a scalability with the number of the sub-engines of the switching device is improved.

According to a preferred embodiment of the invention the sub-engine receives the data packet from the control unit for the further processing of the received data packet. The sub-engine extracts from the tagged-header the hash-tag. The sub-engine processes the received data packet if the hash-tag indicates that the sub-engine is designated for the further processing of the received data packet. Preferably, the hash-tag indicates that the sub-engine is designated for the further processing of the received data packet by a numerical number. It is possible that the numerical number is smaller than or equal to the number of the two or more sub-engines.

According to a preferred embodiment of the invention the filtered information comprises one or more information elements selected from the group Internet Protocol source address, Internet Protocol destination address, Internet Protocol source port, Internet Protocol destination port, type of transport protocol, and Type of Service Bits. It is also possible, that the filtered information is arranged in a five-tuple comprising an Internet Protocol source address, an Internet Protocol destination address, an Internet Protocol source port, an Internet Protocol destination port, and a Type of Service Bits.

Preferably, Type of Service Bits comprise eight bits in the IP header. The Type of Service Bits can be divided into one or more sub-fields. These sub-fields can provide one or more information elements of the group of precedence bits, a request low delay bit, a request high throughput bit, a request high reliability bit, a requests low cost bit and/or Explicit Congestion Notification bits. The precedence bits can be set to routine, priority, immediate, flash, flash override, critical, internetwork control, or network control. However, it is also possible that first six of the eight bits are a DSCP (DSCP=Differential Service Code Point). The Type of Service Bits can be used to identify types of service classes to which the data packet can be assigned to.

According to a preferred embodiment of the invention the hash-function comprises a modulo-p function. The number p is a number with p<N or p=N and wherein N is the number of the two or more sub-engines. The number p can be a prime number. It is also possible, that the number p is not a prime number. Preferably, the number p is the next smaller prime number to N. If a number p is used which is the next smaller prime number to N, then a processing load can be optimally distributed between the two or more sub-engines. It is possible, if p<N then one or more, preferably N−p, sub-engines do not further process the data packet. Preferably, in cases where p>N then one or more, preferably p−N, sub-engines further process data packets associated with two or more hash-tags.

It is also possible, that the hash-function is a function comprising a polynomial division. The hash-function is adapted to the size of the filtered information, in particular its bit-length. The hash-function can be CRC-function (CRC=Cyclical Redundancy Check). Preferably, a type of the CRC-function is depending on the size of the filtered information, in particular its bit-length. The CRC-function can be implemented by software means or by hardware means. In particular, the CRC-function is preferred to calculate the hash-tag for big filter results of the filter operation in fast hardware solutions.

Furthermore, it is possible that the modulo-p function is a, preferably mathematical, function which returns as result the remainder of the integer division of an integer number divided by the number p. The modulo-p function can map any integer number j to a number k of the interval [0, . . . , p−1]. In such a case the modulo-p function can be denoted by mod(j, p), wherein the result or return value is given by mod(j, p) k and the cardinality of the interval [0, . . . , p−1] equals the number p. With this respect a suitable hash-function h may be given by h(j)=1+mod(j, p), since the first sub-engine of the two or more sub-engines may be numbered with the number 1. Preferably, the number p is smaller than or equal to the number N, since otherwise the modulo-p function can map an integer j' to a number k' which is larger than the number of the two or more sub-engines N and thereby the number k' would be not suitable as a hash-tag indicating directly a sub-engine for the further processing of the data packet.

According to a preferred embodiment of the invention the hash-function is adapted to map the filtered information to a number k. The number k is an element of the interval [m, . . . , M] of natural numbers. The natural number m is a minimum value. Preferably, the minimum value m=1. M is a maximum value with M<N or M=N, wherein N is the number of the two or more sub-engines. In particular, it is possible that the minimum number m and the maximum number M are the minimum number and the maximum, respectively, of the numbers in the interval [m, . . . , M].

According to a preferred embodiment of the invention the hash-function is arranged in such a way that all values of the hash-function are equally distributed between a minimum value and a maximum value of the hash-function. Thereby, it is possible to load balance the usage of the two or more sub-engines.

According to a preferred embodiment of the invention the control unit is adapted to apply more than one filter operation for successive application to the header in order to generate thereby the filtered information. The successive application of more than one, preferably simple, filter operation can provide an improved execution time of the control unit for generating the filtered operation. The successive application of more than one filter operation can be replaced by a single, preferably complex, filter operation. The wording simple means with this respect that the filter operation is realizable with a reduced amount of software and/or hardware effort, whereas the wording complex means with this respect that the filter operation is realizable with a large amount of software and/or hardware effort. Therefore, it is possible that successive application of more than one simple filter operation provides a smaller execution time of the control unit for generating the filtered operation than the usage of one complex filter operation which is equivalent to the more than one simple filter operation.

It is in particular possible to measure or to determine the amount of software and/or hardware effort of a function, e.g. the hash-function, the filter operation, a tag-switch and/or a switching operation, like the switching of the data packet, by measuring a respective execution time of the function. A large amount of software and/or hardware effort of a function corresponds to respective large execution time of the function, which is larger than an execution time of another function. In this case an amount of software and/or hardware effort of the other function corresponds to respective shorter execution time of the other function than that of the function and the amount of software and/or hardware effort of the other function is a reduced amount of software and/or hardware effort. For instance, in case that the amount of software and/or hardware effort of a function, e.g. the hash-function, the filter operation, a tag-switch and/or a switching operation, like the switching of the data packet, has been determined in advance, it is possible to optimize and/or improve scalability and/or data packet throughput or bandwidth of the switching device.

Preferably, in case that more than one filter operation for successive application to the header in order to generate the filtered information are applied by the control unit, the control unit is adapted to generate one or more elements of the filtered information. It is possible that for each of the more than one filter operation a respective element of the filtered information is generated. The control unit is adapted to apply one or more intermediate hash-functions to one or more of the elements of the filtered information or to each of the elements of the filtered information. Thereby, the result of these one or more intermediate hash-functions can be also regarded as the generated filtered information or as part of the generated filtered information. The hash-function is then applied to the generated filtered information and/or to the part of the generated filtered information. The one or more intermediate hash-functions can be similar to the hash-function. Preferably, the one or more intermediate hash-functions are modulo-p functions and/or can have the same or similar characteristics as the hash-function. The characteristics of the hash-function have been previous described. The one or more intermediate hash-functions can be also understood as a functionality of the more than one filter operation and/or the filter operation. It is also possible, that the one or more intermediate hash-functions are CRC-functions.

Preferably, in cases the number of sub-engines shall be exactly matched by a Hashing method, which is realized by the hash-function, and load balancing, between two or more, preferably all, of the sub-engines shall be performed in a way that it can be externally controlled, a hash-table is preferably inserted between the calculation of the hash-tag and addressing of the sub-engines. The hash-tag can be the entering or the exiting data of the table depending on the embodiment of the invention. If the result of the hash-function is used as tag and therefore the entering data, e.g. a search key or index, of the table, the hash-table can be realized directly by a switching table with the sub-engine assigned to one or more tags. Such an embodiment is preferred, in cases where a number of different data traffic flows T associated with the data packets is larger than the number of the sub-engines N, and further a modulo-p function as hash-function is used, wherein $T>p>N$ or $T>>p>>N$.

According to a preferred embodiment of the invention the switching device comprises a tag-switch. The tag-switch switches the data packet to the sub-engine according to the tagged-header. Preferably, the tag-switch is a functionality of the control-unit and/or a further entity or device of the switching device. The functionality of the tag-switch can be realized in part or completely by software means and/or hardware means.

According to a preferred embodiment of the invention the switching device removes the header-tag from the tagged-header. Preferably, a tag-switch removes the header-tag from the tagged-header. Thereby, the original header is provided prior switching the data packet to the sub-engine according to the tagged-header. Furthermore, there can be no requirement of adaptation of the two or more sub-engines for the further processing of data packets comprising a tagged-header instead of the header.

According to a preferred embodiment of the invention each of the control unit and/or the two or more sub-engines comprises at least one central processing unit. It is possible that the control unit and/or a sub-engine of the two or more sub-engines comprises one or more further devices of the group of memory, cache memory, communication means, and input/output unit.

According to a preferred embodiment of the invention the control unit provides the hash-function and/or the at least one filter operation by hardware means.

Preferably, one or more entities of the group control-unit, hash-function, at least one filter operation, one or more sub-engines of the two or more sub-engines, and tag-switch are provided by software means and/or hardware means. The tag-switch switches the data packet to the sub-engine according to the tagged-header.

According to a preferred embodiment of the invention the control-unit and/or one or more of the sub-engines are interconnected by means of a communication bus. For instance, the control-unit and/or one or more sub-engines of the two or more sub-engines are interconnected by means of one or more technologies of the group of Ethernet, InfiniBand, wireless network technologies, and network technologies based on optical fiber. Preferably, a communication bus interconnecting the control-unit and/or one or more sub-engines of the two or more sub-engines is a serial bus or a parallel bus. The switching device can comprise communication means. It is possible that the communication means are or comprise one or more interfaces which are preferably high speed interfaces. The communication bus can provide a high bandwidth which can be of at least 10 Gbit/s. In particular, it is possible that each of the one or more interfaces provides a high bandwidth which can be of at least 10 Gbit/s. Preferably, the communication bus can provide of a least 1 or 10 Tbit/s in order to provide a sufficiently large bandwidth to carry an aggregated traffic of the data packets handled by means of the communication means comprising the one or more interfaces.

Preferably, the two or more sub-engines are provided and/or comprised by a parallel processing unit, in particular a massive parallel processing unit.

It is possible that at least two entities of the group control unit, communication means, data base, and parallel processing unit comprising the two or more sub-engines are interconnected with each other via a first communication bus. Preferably, the communication means comprises at least one interface. Furthermore, a second communication bus can interconnect at least two or each of the two or more sub-engines with each other. It is possible that the first communication bus is interconnected with the second communication bus. As described above, preferred technologies, which may be used for realizing the first communication bus and/or the second communication bus are one or more technologies of the group of Ethernet, InfiniBand, wireless network technologies, and network technologies based on optical fiber.

Preferably, the hash-tag is inserted in the header as a MPLS tag and/or as a VLAN tag. It is also possible that the hash-tag is inserted in a MPLS tag and/or in a VLAN tag of the header of the data packet.

The control unit can also provide the functionality of a sub-engine. Thereby, it is possible that the control unit can act as sub-engine for the further processing of the data packet.

Summarizing a main idea of the present invention is as follows: Embodiments in accordance with the present invention are also applicable using massive parallel architectures—as said in the above—preferably comprising ten thousand to hundred thousands of sub-engines, e.g. for switching and/or routing. In case of using the method of processing a plurality of data packets scaling can be improved. The method only scales better if not only the load is shared amongst the individual cores, i.e. the sub-engines, but also the complexity. Shifting the task, i.e. the processing, to a unit that performs per flow tagging, i.e. tagging of the data packet flows, does solve only sub-optimally the problem because all the complexity is shifted to the tagging device. However, the embodiments according to the present invention solve this dilemma by a basically two step approach: In a first, the relevant bits of one or more headers or header elements are filtered-out. A hash, i.e. a hash-tag, from this information is generated corresponding to the number of cores or sub-engines the overall load shall be distribute upon. The hash-tag is used as label and is inserted into the data packet. In a second step the data packet is switched to the core or the sub-engine, respectively addressed by the hash-tag for the further processing, e.g. a final routing and/or switching decision.

Embodiments of the present invention provide improved scalability. Hashing is or the hash-function provides, respectively a "dumb" algorithm operating agnostic on the bits filtered and generated an output which is similar to pseudo random numbers. If the bits the hashing algorithm operates on are chosen well, e.g. by avoiding TTL (TTL=Time To Live) or sequence number fields, and only using information which is static per flow, in particular data traffic flow, and/or connection all data packets belonging to a flow and/or connection, respectively can be passed to the same core, i.e. sub-engine.

Hashing operates on the filtered information, in particular filtered header information, and considers therefore only "where to look", and not "what is the information inside the data packet". Therefore, the core, i.e. the sub-engine, addressed by the hash-tag can deal only with a limited subset of all flows, in particular data traffic flows. Cascading by using different filter-rules per cascade or filter operations can lead to protocol or service specific distribution of data packets to individual cores, i.e. sub-engines, without having detailed knowledge of the protocols dispatched. The cores or sub-engines in return then can focus on dedicated jobs. If a VLAN tag as location of insertion of the hash-tag is used, the fan-out can reach up to 1:4096 cores or sub-engines—since 12 bits can used for inserting the hash-tag, which corresponds to the scale of massive parallel processors available for computing. An MPLS label will offer a fan-out of 1:1048576 cores or sub-engines, since 20 bits can be used for inserting the hash-tag.

These as well as further features and advantages of the invention will be better appreciated by reading the following detailed description of presently preferred exemplary embodiments taken in conjunction with accompanying drawings of:

Figure 1:
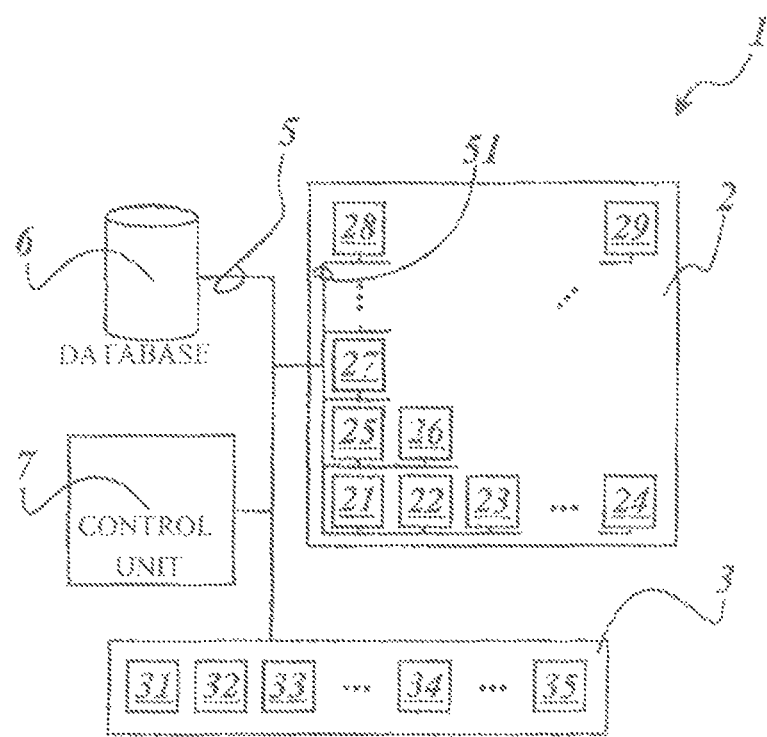
FIG. 1 shows a diagram of a preferred embodiment of the switching device.

FIG. 1 shows a diagram of a preferred embodiment of the switching device 1. The switching device 1 comprises entities as follows: a parallel processing unit 2, a communication means 3, a first communication bus 5, a database 6 and a control unit 7. These entities can be provided within a single housing (not shown) or can be provided by one or more sub-devices which comprise each one or more of these sub-devices (not shown). Preferably, the first communication bus 5 is a serial bus or a parallel bus providing a high bandwidth, e.g. of at least 10 Gbit/s. The switching device 1 is an entity of a packet switched communication network (not shown). The packet switched communication network can be a core communication network, an edge and/or access communication network, a telecommunication network, a wire based communication network, a wireless communication network, and/or a power line communication network.

It is possible, that the switching device 1 comprises a further communication bus, such that the first communication bus 5 and the further communication bus provide two communication paths, wherein one of these two communication buses transports the data packets between N sub-engines 21, . . . , 29 of the parallel processing unit 2 and wherein the other of these two communication buses transports system control data, and/or data associated with data packets which can be provided by the data base 6. Thereby the other of these two communication buses can act as control bus, wherein the first communication bus 5 is designated to the switching and/or processing of the data packets The parallel processing unit 2 comprises N sub-engines 21, . . . , 29. Preferably, N is at least 256. The N sub-engines 21, . . . , 29 are labeled sequentially with the numbers 1, . . . , N. The N sub-engines 21, . . . , 29 are interconnected by a second communication bus 51. Preferably, the second communication bus 51 is a serial bus or a parallel bus providing a high bandwidth, e.g. of at least 10 Gbit/s. Each sub-engine of the N sub-engines 21, . . . , 29 provides at least a central processing unit, a memory, a cache memory, and a communication means for communicating via the second communication bus 51, and preferably via the first communication bus 5. Furthermore, each sub-engine of the N sub-engines 21, . . . , 29 is adapted to perform the switching of data packets. In particular, each sub-engine of the N sub-engines 21, . . . , 29 can be adapted to perform a Deep Packet Inspection of a data packet, and/or evaluate and manipulate a header of a data packet. Preferably, the parallel processing unit 2 is parallel processor, wherein one or more processing cores of the parallel processor provide the N sub-engines 21, . . . , 29.

The communication means 3 comprises at least one interface 31, . . . , 35. For instance, the communication means comprises 48 interfaces which can act as ports. The communication means 3 provides at least the functionality and a respective protocol and protocol stack for communicating according to at least OSI layer 2 or 3 (OSI=Open System Interconnection Reference Model). Each of the interface 31, . . . , 35 provides a high bandwidth, e.g. of at least 1 Gbit/s.

The first communication bus 5 interconnects the parallel processing unit 2, the communication means 3, the data base 6 and the control unit 7 with each other. The parallel processing unit 2 is interconnected with the first communication bus 5 by means of the second communication bus 51.

The data base 6 holds data associated with the switching of a plurality of data packets. Preferably, the data base 6 comprises a central processing unit, storage means, like one or more hard disks or solid state disks, and communication means for communicating via the first communication bus 5. The data held by the database 6 can comprise additional data providing state information of data traffic flows, e.g. of real-time service or communication session information, which is usable for switching the plurality of data packets. The data traffic flows are associated with data packets of the plurality of data packets. For instance, the data traffic flows are associated with Voice over IP sessions, IP conferencing sessions, IP gaming sessions, and/or standard IP sessions, like RTP sessions, SIP sessions, FTP session, SSH sessions, HTTP and/or HTTPS sessions, SMTP etc. (RTP=Real-time Transfer Protocol, SIP=Session Initiation Protocol, FTP=File Transfer Protocol, SSH=Secure Shell, HTTP=Hyper-Text Transfer Protocol, HTTPS=HTTP Secure, SMTP=Simple Mail Transfer Protocol).

The control unit 7 comprises at least a central processing unit, a memory, a cache memory, and communication means for communicating via the first communication bus 5. The control unit 7 is adapted to receive a data packet comprising a header via its communication means 3. The control unit 7 is adapted to apply at least one filter operation to the header. Thereby it is possible to generate filtered information. The control unit 7 is also adapted to map the filtered information on a hash-tag. The mapping is executed according to a hash-function. The control unit 7 is adapted to provide a tagged-header. The tagged-header can be the original header, wherein the hash-tag has been inserted in the header by the control unit 7 and thereby forming the tagged header. For instance, in cases where the header of the data packet comprises a MPLS tag and/or a VLAN tag, the hash-tag can be inserted in this MPLS tag and/or a VLAN tag, respectively. In such a case the header and the tagged-header have the same bit-length. However, it is also possible that the hash-tag is inserted in the header by adding it to the header. In this case the tagged-header has a bit-length which is at least as long as the sum of the bit-length of the header and the bit-length of the hash-tag. In any case the control unit 7 is adapted to insert the hash-tag in the header of the data packet. Furthermore, the control unit 7 is adapted to send the data packet to a sub-engine 24 of the N sub-engines 21, . . . , 29 according to the tagged-header for further processing of the data packet.

It is possible, that the hash-tag is inserted between an Ethernet-header and an IP-header, between an IP-tunnel header and the IP-header, or in an MPLS-tag above the IP-header.

Figure 2:
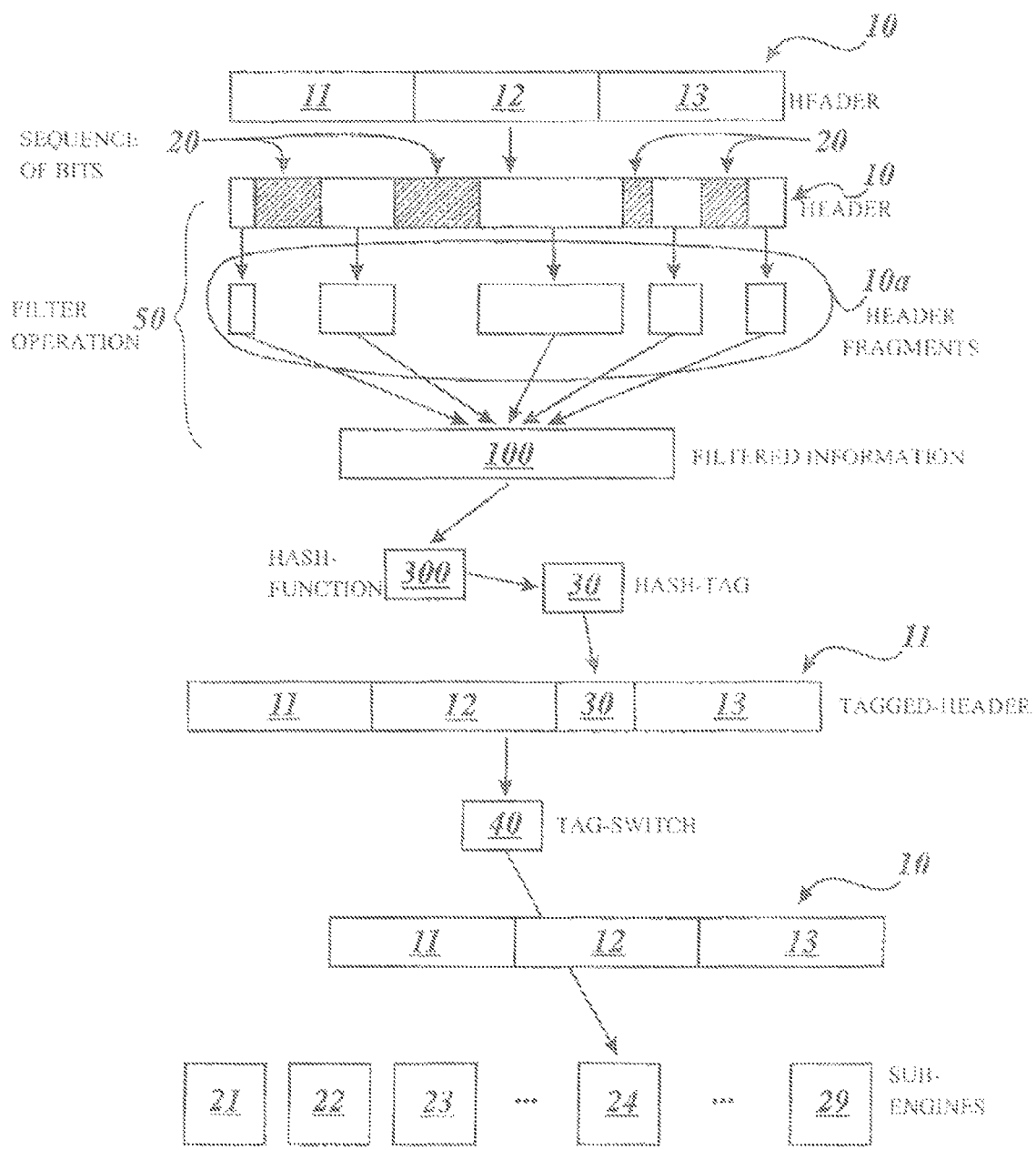
FIG. 2 shows a flow chart of a preferred embodiment of the method of processing a plurality of data packets.

FIG. 2 shows a flow chart of a preferred embodiment of the method of processing a plurality of data packets in a packet switched communication network. A preferred embodiment of the method of processing a plurality of data packets is in the following described by means of FIG. 2 as follows:

The control unit 7 provides a filter operation 50 for filtering information from the header 10 of a data packet. The filter operation 50 can be divided into one or more sub-filter operations, which are also filter operations, for successive application to the header 10 in order to generate thereby filtered information 100. Preferably, the header 10 of the data packet comprises one or more bits for storing one or more information elements associated with the data packet. The filter operation 50 filters can select bits and/or sequences of bits 20 from the header 10 and generates thereby header fragments 10*a*. The filter operation 50 generates the filtered information 100 based on the header fragments 10*a*. The filtered information 100 is arranged in a five-tuple comprising an IP source address, an IP destination address, an IP source port, an IP destination port, and a type of transport protocol. Thereby, the filtered information 100 can be used to associate data packets to respective data traffic flows. In the following the filtered information 100 can be denoted by j. The filter operation 50 can also be adapted to filter an identifier indicating an association of the data packet to a data traffic flow of one or more data traffic flows associated with the plurality of data packets. The five-tuple can be interpreted as such an identifier.

It is also possible, that one or more information elements selected from the group DSCP, a protocol field of the IP-header, a TCP port, a UDP port, a type of Ethernet, an MPLS tag, VLAN tag, data of the payload of the data packet is used as filtered information (TCP=Transmission Control Protocol, UDP=User Datagram Protocol). If Hashing and tag-switching is performed in the payload area of the packets, preferably, one or more sub-engines test and/or check the data packets against computer malware signatures, in particular virus signatures, or characteristics of computer crimes, like Denial of Service attacks.

The control unit 7 provides a hash-function 300 for mapping the filtered information 100 comprising said identifier to a number k with k being an element of the interval [m, ..., M] of natural numbers. The natural number m is a minimum value and the natural number M is a maximum value of the interval [m, ..., M]. For instance, the switching device comprises N=256 sub-engines 21, ..., 29. In the following it is assumed that for some reason a hash function which comprises a modulo-p function with p=256 is not desired, but p being a prime number. However, in general a modulo-p function with p=256 would be a preferred hash-function.

There are two closest prime numbers $p_1$=251 and $p_2$=257. The prime number $p_1$=251 is the next smaller prime number to N=256, i.e. the number of sub-engines 21, ..., 29.

In the case that the control unit 7 is not able to act as a sub-engine then $p_1$=251 can be used to define a hash-function 300. The hash-function 300 is a modulo-p function $h_1(j)$=1+mod(j,$p_1$)=k. Consequently, m=1 and M=251.

In this case, the cardinality of the interval [m, ..., M] equals $p_1$.

In another case the control unit 7 is able to act as a sub-engine then $p_2$=257 can be used to define a hash-function 300. The hash-function 300 is a modulo-p function $h_2(j)$=mod(j, $p_2$)=k. Thereby, in practice, N+1 sub-engines are available. The prime number $p_2$ is the next smaller prime number to N+1, which is in that case identical to N+1 by definition. Consequently, m=0 and M=256. In cases where $h_2(j)$=0, i.e. k=0, the control unit 7 performs the further processing of the data packet. In this case, the cardinality of the interval [m, ..., M] equals $p_2$.

In both cases, all values k of the hash-function 300 are equally distributed between a minimum value m and a maximum value M of the hash-function 300, since the hash-function is in both case practically a modulo-p function. This equal distribution of the values k of the hash-function 300 can provide a load balance of loads of the sub-engines 21, ..., 29 during the further processing of the data packets.

It is also possible, in case that the control unit 7 is not able to act as a sub-engine then $p_2$=257 can be used to define a hash-function 300. However, in this case, a modulo-p function $h_3(j)$=1+mod(j,$p_2$)=k maps j to k in the interval [1, ..., 257]. In order that data packets associated with a hash-tag, which is larger than the number of N of the sub-engines 21, ..., 29, are processed these data packets have to be directed to one or more of the sub-engines 21, ..., 29 for the further processing, e.g. the sub-engine with number 1. In particular, it is possible, to associate more than one hash-tags with one sub-engine. Thereby, it can be guaranteed that all data packets are processed, however an equal distribution of the values k of the hash-function 300 may not be provided to load balance the loads of the sub-engines 21, ..., 29 during the further processing of the data packets.

Furthermore, alternatively, the parallel processing unit 2 provides one or more processing cores within a multiprocessor architecture. The parallel processing unit 2 can provide the two or more sub-engines 21, ..., 29 as virtual sub-engines, e.g. N=256 virtual sub-engines. Using virtual sub-engines enables that the number of the virtual sub-engines can be exactly adapted to the hash-function 300 which is preferably a modulo-p function. An optimal choice for a prime number p determining the hash-function 300 can be the next prime number p' to the number of available processing cores. However, it is possible that the next prime number p' to the number of available processing cores is larger than the number of available processing cores. In this case a hash-function h'(j, p')=mod(j, p')=k' with k' in the interval [0, ..., p'−1] can map alto a k' which cannot be associated with a processing core. By means of virtualization of the sub-engines, it is possible that the available processing cores provide exactly p' virtual sub-engines 21, ..., 29 allowing an optimal use of the parallel processing unit 2.

In the above example the number $p_1$ and/or number $p_2$ can be replaced with a natural number which is not a prime number.

Preferably, in case that more than one filter operation for successive application to the header in order to generate the filtered information 100 are applied by the control unit 7, the control unit 7 is adapted to generate one or more elements, e.g. bits and/or sequences of bits 20, of the filtered information 100. It is possible that for each of the more than one filter operation a respective element of the filtered information is generated. The control unit 7 is adapted to apply one or more intermediate hash-functions to one or more of the elements of the filtered information or to each of the elements of the filtered information.

Thereby, the result of these one or more intermediate hash-functions can be regarded as the generated filtered information or as part of the generated filtered information 100. The hash-function 300 is then applied to the generated filtered information 100 and/or to the part of the generated filtered information. It is possible that the hash-function 300 comprises more than one modulo-p calculation, like modulo-p summation and/or modulo-p multiplication, wherein p is preferably a prime number, because otherwise an equal distributed and/or complete mapping of all, preferably p, values of the hash-function 300 to the two or more sub-engines 21, . . . , 29 can not be guaranteed. The hash-function 300 can comprise explicitly or implicitly the more than one modulo-p calculation. The wording explicitly means with this respect that this more than one modulo-p calculation is only provided by the hash-function 300, whereas the wording implicitly means with this respect that this more than one modulo-p calculation is provided by the hash-function 300 and/or by the one or more intermediate hash-functions.

It is also possible that more than one processing core is used to provide a sub-engine, which is a virtual sub-engine, by means of virtualization. Thereby, virtualization can allow the usage of arbitrarily chosen hash-functions. Furthermore, it is possible to choose arbitrarily the number of the two or more sub-engines, wherein the sub-engines are virtual sub-engines.

Furthermore, the cardinality of the interval [m, . . . , M] can be larger than or equal to the number of one or more data traffic flows for sending data packets associated with a different data traffic flows of the plurality of data packets to different sub-engines of the N=256 sub-engines 21, . . . , 29 in accordance with the tagged-header 11. Thereby, it is possible to implicitly assign data packets associated with the same data traffic flow to the same sub-engine of the N=256 sub-engines 21, . . . , 29.

Turning now to the method in more detail: The method is performed further exemplarily as follows:

The control unit 7 receives a data packet comprising the header 10 of a communication packet exchanged via the communication network. The control unit 7 applies the filter operation 50 to the header 10 and generates thereby the filtered information 100 as previously described. The control unit 7 maps the filtered information 100 on the hash-tag 30 according to the hash-function 300. It is in particular possible, that the control unit 7 provides the hash-function 300 and/or the at least one filter operation 50 by hardware means. The control unit 7 provides the tagged-header 11 by means of inserting the hash-tag 30 in the header 10 of the data packet. The control unit 7 sends the data packet to a sub-engine 24 of the N=256 sub-engines 21, . . . , 29 according to the tagged-header 11 for further processing of the data packet by means of a tag-switch 40. The tag-switch 40 switches the data packet to the sub-engine 24 according to the tagged-header 11. The switching device 1 comprises the tag-switch 40. The tag-switch 40 removes the header-tag 30 from the tagged-header 11 and thereby the original the header 10 is provided prior switching the data packet to the sub-engine 24 according to the tagged-header 11. The sub-engine 24 receives the data packet from the control unit 7 for the further processing of the received data packet. The sub-engine 24 accesses the data base 6 holding data associated with the received data packet and/or the hash-tag 30 for the further processing of the received data packet in case a memory of the sub-engine 24 is not holding the data associated with the received data packet and/or the hash-tag 30. The sub-engine 24 extracts the hash-tag 30 from the tagged-header 11. The sub-engine 24 processes the received data packet by using the header 10, the data associated with the received data packet and/or the hash-tag 30, and/or a payload of the received data packet. Alternatively, it is possible that the tag-switch does not remove the header-tag 30 from the tagged-header. In such a case, a numerical number k, which is preferably the header-tag 30, allows that the sub-engine 24 can check if the sub-engine 24 is designated for the further processing of the received data packet and may thereby in an affirmative case further process the received data packet.

The invention claimed is:

1. A method of processing a plurality of data packets in a packet switched communication network comprising at least one switching device, the method comprising:
   receiving, by a processor of the at least one switching device that includes a tag-switch, a data packet comprising a header of a communication packet exchanged via the communication network;
   applying, by the processor, at least one filter operation to the header and generating thereby filtered information;
   mapping, by the processor, the filtered information on a hash-tag according to a hash-function;
   providing, by the processor, a tagged-header by inserting the hash-tag in the header of the data packet;
   sending, by the processor, the data packet to a sub-engine of two or more sub-engines of the switching device according to the tagged-header for further processing of the data packet, and the tag-switch switches the data packet to the other sub-engine according to the tagged-header;
   providing, by a parallel processor of the switching device, the two or more sub-engines as virtual sub-engines, a number of virtual sub-engines being equal to a number of hash-tag values generated by the processor according to a result of the hash-function, and the number of virtual sub-engines being larger than a number of available processing cores from among processing cores provided by the parallel processor, the number of virtual sub-engines varying depending on the number of hash-tag values; and
   processing, by the other sub-engine, the received data packet by using a payload of the received data packet.

2. The method according to claim 1, wherein at least one filter operation filters-out an identifier indicating an association of the data packet to a data traffic flow of one or more data traffic flows associated with the plurality of data packets, and the hash-function maps the filtered information comprising said identifier to a number k with k being an element of the interval [m, . . . , M] of natural numbers, m being a minimum value preferably with m=1, M being a maximum value with M<N or M=N, N being the number of the two or more sub-engines and, preferably, the cardinality of the interval [m, . . . , M] being larger than or equal to the number of one or more data traffic flows in order to send data packets associated with a different data traffic flows of the plurality of data packets to different sub-engines of the two or more sub-engines in accordance with the tagged-header.

3. The method according to claim 1, wherein the method comprises:
   receiving, by the sub-engine, the data packet from the controller processor for the further processing of the received data packet,
   accessing, by the sub-engine, a data base holding data associated with the received data packet and/or the hash-tag for the further processing of the received data packet in case a memory of the sub-engine is not holding the data associated with the received data packet and/or the hash-tag, and
   processing, by the sub-engine, the received data packet by using the header, the data associated with the received data packet and/or the hash-tag, and/or a payload of the received data packet.

4. The method according to claim 1, wherein the method comprises:

receiving, by the sub-engine, the data packet from the processor for the further processing of the received data packet, extracting, by the sub-engine, from the tagged-header the hash-tag, and processing, by the sub-engine, the received data packet if the hash-tag indicates, preferably by a numerical number, that the sub-engine is designated for the further processing of the received data packet.

5. A switching device for switching communication packets in a packet switched communication network, wherein the switching device comprises:

two or more sub-engines and a processor including a tag-switch, the processor being configured to, receive a data packet comprising a header of one of the communication packets exchanged via the communication network, apply at least one filter operation to the header and generate thereby filtered information, map the filtered information on a hash-tag according to a hash-function, provide a tagged-header by inserting the hash-tag in the header of the data packet, and send the data packet to a sub-engine of the two or more sub-engines according to the tagged-header for further processing of the data packet, the tag-switch being configured to switch the data packet to another sub-engine according to the tagged-header;

a parallel processor including one or more processing cores, the parallel processor configured to, provide the two or more sub-engines as virtual sub-engines, a number of the virtual sub-engines being equal to a number of hash-tag values generated by the processor according to a result of the hash-function, and the number of virtual sub-engines being larger than a number of available processing cores of the one or more processing cores, the number of virtual sub-engines varying depending on the number of hash-tag values; and the other sub-engine configured to process the received data packet by using a payload of the received data packet.

6. The switching device according to claim 5, wherein the filtered information comprises one or more information elements selected from the group Internet Protocol source address, Internet Protocol destination address, Internet Protocol source port, Internet Protocol destination port, type of transport protocol, and Type of Service Bits, or wherein the filtered information is arranged in a five-tuple comprising an Internet Protocol source address, an Internet Protocol destination address, an Internet Protocol source port, an Internet Protocol destination port, and a Type of Service Bits.

7. The switching device according to claim 5, wherein the hash-function comprises a modulo-p function, $p<N$ or $p=N$ with N being the number of the two or more sub-engines, preferably p being a prime number and/or p being the next smaller prime number to N.

8. The switching device according to claim 5, wherein the hash-function is configured to map the filtered information to a number k with k being an element of the interval $[m, \ldots, M]$ of natural numbers, m being a minimum value preferably with $m=1$, M being a maximum value with $M<N$ or $M=N$ and N being the number of the two or more sub-engines.

9. The switching device according to claim 5, wherein the hash-function is arranged in such a way that all values of the hash-function are equally distributed between a minimum value and a maximum value of the hash-function.

10. The switching device according to claim 5, wherein the processor is configured to apply more than one filter operation for successive application to the header in order to generate thereby the filtered information.

11. The switching device according to claim 5, wherein the switching device comprises a tag-switch which switches the data packet to the sub-engine according to the tagged-header.

12. The switching device according to claim 5, wherein the switching device, preferably by a tag-switch, removes the header-tag from the tagged-header and thereby providing the original the header prior switching the data packet to the sub-engine according to the tagged-header.

13. The switching device according to claim 5, wherein the two or more sub-engines comprises at least one central processor.

14. The switching device according to claim 5, wherein the at least one of the hash-function and the at least one filter operation are implemented by a hardware structure.

15. The switching device according to claim 5, wherein the processor and one or more of the sub-engines are interconnected by a communication bus and each of the sub-engines is configured to process a data packet received via the communication bus if the hash-tag indicates that the sub-engine is designated for the further processing of the received data packet.

* * * * *